United States Patent [19]
Shimizu et al.

[11] Patent Number: 5,680,189
[45] Date of Patent: Oct. 21, 1997

[54] LCD COLUMNAR SPACERS MADE OF A HYDROPHILIC RESIN AND LCD ORIENTATION FILM HAVING A CERTAIN SURFACE TENSION OR ALIGNMENT CAPABILITY

[75] Inventors: Michio Shimizu, Chiba; Takeshi Nishi; Toshimitsu Konuma, both of Kanagawa, all of Japan

[73] Assignee: Semiconductor Energy Laboratory Co., Ltd., Atsugi, Japan

[21] Appl. No.: 483,046

[22] Filed: Jun. 7, 1995

Related U.S. Application Data

[62] Division of Ser. No. 245,045, May 17, 1994, Pat. No. 5,539,545.

[30] Foreign Application Priority Data

| May 27, 1993 | [JP] | Japan | 5-148543 |
| May 18, 1993 | [JP] | Japan | 5-139395 |
| May 18, 1993 | [JP] | Japan | 5-139397 |

[51] Int. Cl.[6] .................. G02F 1/1337; G02F 1/1339
[52] U.S. Cl. .................. 349/123; 349/130; 349/132; 349/155
[58] Field of Search .................. 359/51, 52, 77, 359/78, 81; 349/86, 88, 123, 130, 132, 155

[56] References Cited

U.S. PATENT DOCUMENTS

| 5,150,231 | 9/1992 | Iwamato et al. | 359/100 |
| 5,321,533 | 6/1994 | Kumar | 359/51 |
| 5,473,450 | 12/1995 | Yamada et al. | 359/51 |
| 5,490,001 | 2/1996 | Konuma | 359/52 |

Primary Examiner—William L. Sikes
Assistant Examiner—Walter J. Malinowski

[57] ABSTRACT

A liquid crystal display using a hydrophobic material as the material of resinous columns to orient the molecules of the liquid crystal parallel to the substrates. A hydrophilic material can also be used as the material of resinous columns to orient the molecules of the liquid crystal vertical to the substrates. The liquid crystal molecules are oriented horizontally by making the surface tension of the orientation film greater than the surface tension of the resinous columns. The liquid crystal molecules are oriented vertically by making the surface tension of the orientation film smaller than the surface tension of the resinous columns. A mixture of a liquid crystal material and an uncured resin is placed in a liquid crystal cell. The uncured resin is precipitated (deposited) out of the mixture. The molecules of the liquid crystal material are oriented. Then, the uncured resin is cured. Thereafter, an aging step for reorienting the molecules of the liquid crystal material is carried out. This prevents disturbance of the orientation around the resinous columns and leads to an improvement in the voltage holding ratio.

17 Claims, 2 Drawing Sheets

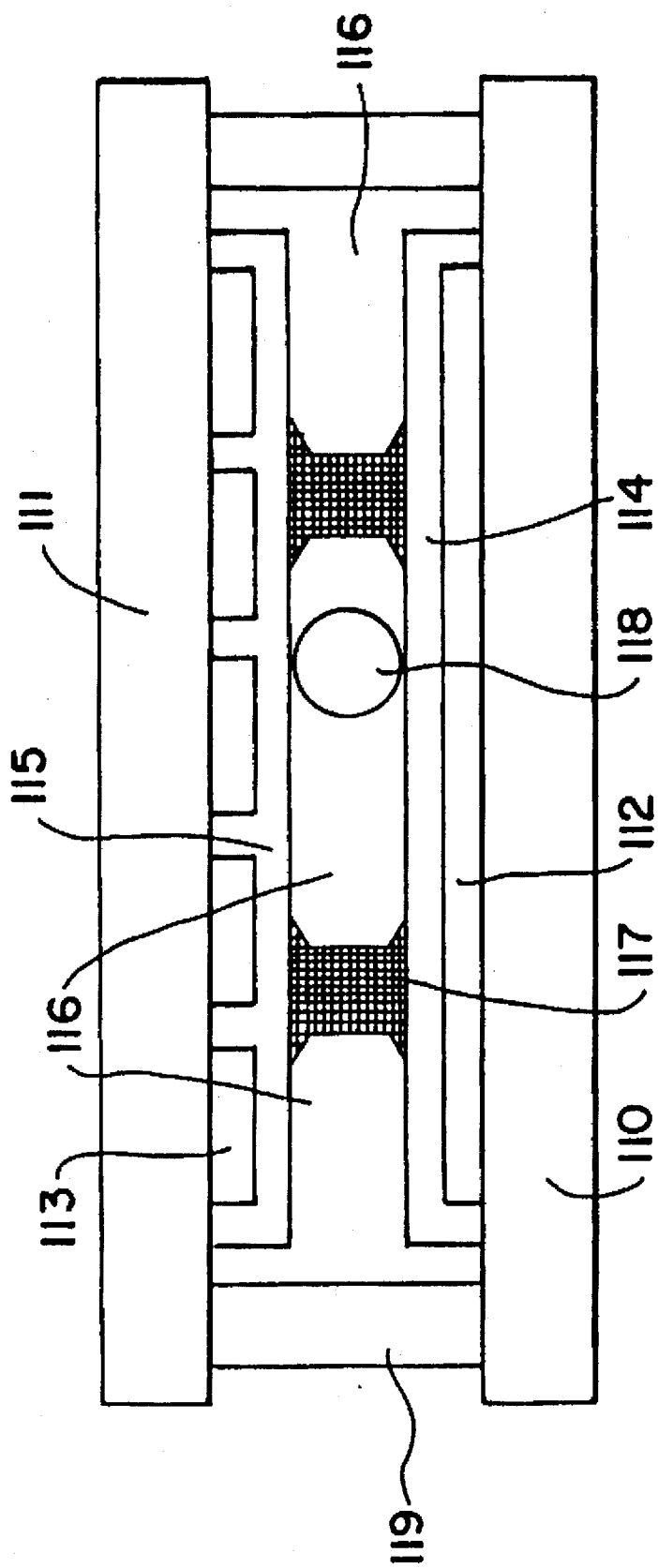

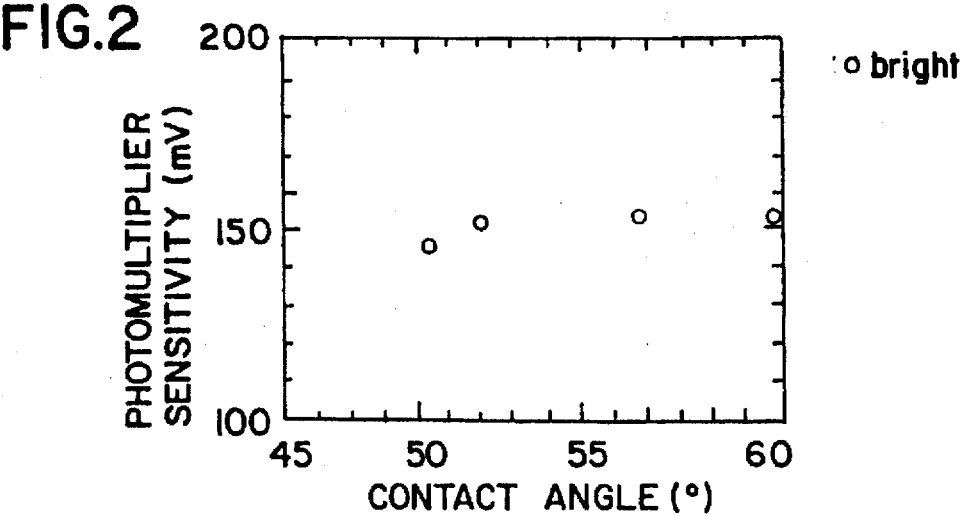
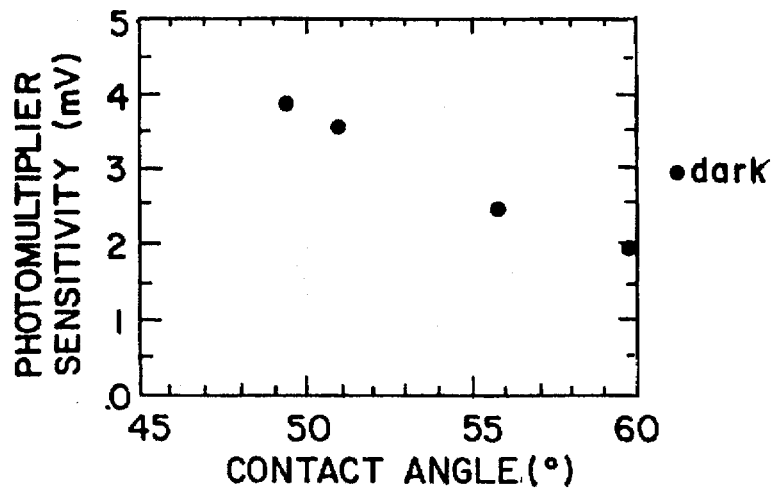
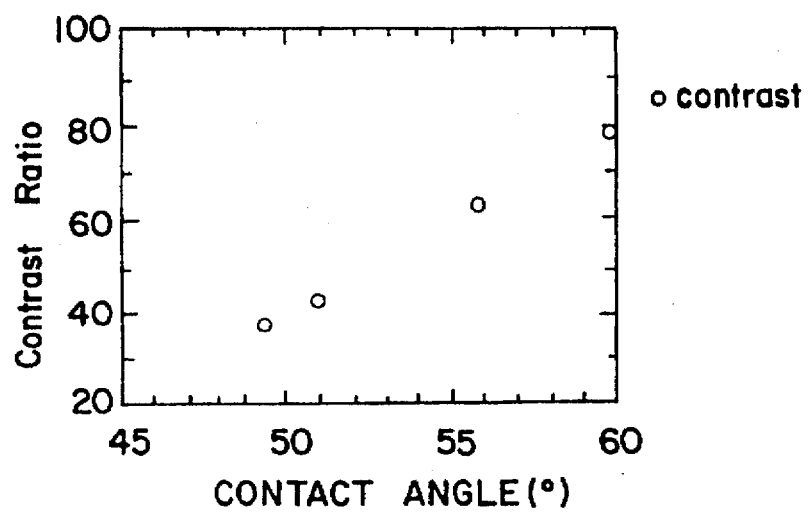

5,680,189

1

LCD COLUMNAR SPACERS MADE OF A HYDROPHILIC RESIN AND LCD ORIENTATION FILM HAVING A CERTAIN SURFACE TENSION OR ALIGNMENT CAPABILITY

This is a Divisional application of Ser. No. 08/245,045, filed May 17, 1994, now U.S. Pat. No. 5,539,545.

FIELD OF THE INVENTION

The present invention relates to a liquid crystal electro-optical device having resinous columns which are formed by precipitating (depositing) an uncured resin out of a mixture of a liquid crystal material and the uncured resin and curing the precipitated (deposited) resin. The present invention also relates to a method of fabricating a liquid crystal electro-optical device by holding a nematic liquid crystal or ferroelectric liquid crystal between substrates, orienting the molecules of the liquid crystal in a given direction, and switching the liquid crystal molecules between different states electro-optically, using polarizing plates, the electro-optical device having resinous columns precipitated (deposited) out of the liquid crystal material.

BACKGROUND OF THE INVENTION

It is common practice to disperse spacers such as spherical silica beads several micrometers in diameter between substrates in order to maintain the spacing between the substrates inside the liquid crystal cell in a liquid crystal electro-optical device. Where spacers are used, a decrease in the substrate spacing can be prevented but an increase in the spacing cannot be prevented. As the area of display screen is increased, the substrates are distorted or the distribution of the liquid crystal material becomes more nonuniform. These spacers can by no means prevent these undesirable situations.

A countermeasure taken against this is to use a method consisting of adding adhesive particles to the spacers and dispersing these particles in the cell so as to maintain the substrate spacing. In this method, however, the orientation around the adhesive tends to be disturbed.

A method of solving the problem with the method of maintaining the substrate spacing has been proposed by the present inventors and others as disclosed in Japanese Patent application Ser. No. 55237/1993. In particular, the substrate spacing is maintained by polymerized column spacers which consist of resinous columns precipitated (deposited) out of a liquid crystal material. More specifically, a mixture of the liquid crystal material and an uncured resin is inserted between substrates. The molecules of the liquid crystal material are oriented. The resinous material is precipitated (deposited) and cured to form resinous columns. Both substrates are bonded together with these columns.

In this method, the resinous columns can be cured while the liquid crystal molecules are oriented inside the cell. The liquid crystal is precipitated (deposited) out of the mixture of the liquid crystal material and the uncured resin, and the molecules of the liquid crystal are oriented. As a result, the resin is shaped. In consequence, the substrate spacing can be maintained while greatly suppressing disturbance of the orientation around the resin.

A known liquid crystal electro-optical device using a PCS is shown in FIG. 1. This device comprises transparent substrates 110, 111, electrodes 112, 113, orientation films 114, 115, a liquid crystal material 116, spacers 118, and a sealing material 119. Resinous columns 117 are formed by precipitating (depositing) a resin out of a mixture of the liquid crystal material and an uncured resin and then curing the resin. These resinous columns are bonded to both orientation films 114 and 115 to thereby maintain the substrate spacing. Where an orientation film is formed on only one electrode, one side of each resinous column is bonded to the corresponding electrode or substrate.

Resins shrink greatly in volume on curing. This is a disadvantage with a PCS. Specifically, after a resin and a liquid crystal separate, the molecules of the liquid crystal are oriented without difficulty around uncured resin. As the resin is cured, it shrinks, thus disturbing the orientation. This deteriorates the optical characteristics, especially the characteristic in dark state. Hence, the contrast drops.

These optical characteristics may not stable, i.e., may vary with a lapse of time. One factor representing the stability of these characteristics is a voltage holding ratio. In particular, a voltage is applied to a pixel in a short time and then the application is stopped. The voltage holding ratio is the ratio of the remaining voltage to the applied voltage. In other words, this factor expresses the degree to which the liquid crystal molecule orientation is maintained. Therefore, in order to increase the voltage holding ratio, the liquid crystal molecules should be more stable, and the orientation should be more uniform.

In a liquid crystal electro-optical device using a PCS, when the liquid crystal molecules are urged to be oriented uniformly along the rubbing direction of the orientation film, the molecules might be oriented vertically or randomly, even if the same liquid crystal and the same resin are used.

One factor affecting the orientation of liquid crystal molecules is a force of the orientation film that restricts the liquid crystal molecules. This restricting force of the orientation film attracts the liquid crystal molecules. Simply, this force is given by surface tension, which is affected by various factors such as the kind of orientation film, baking temperature, film thickness, and the structure of the orientation film surface including rubbing.

Also, the surface tension of the PCS (polymerized column spacer) is a major factor which affects the orientation of liquid crystal molecules. The surface tension varies, depending on whether the resin is an oligomer, a monomer, or a combination thereof.

The orientation of the liquid crystal material of a liquid crystal electro-optical device using a PCS is exactly the same as the orientation of a normal liquid crystal display having no resin except around the PCS. However, the liquid crystal molecules around the PCS are restricted not only by the orientation film but also by the PCS. This deteriorates the orientation.

In recent years, large area liquid crystal displays have attracted attention. Where cheap glass substrates or resinous substrates (plastic substrates) are used for large area displays, the substrates themselves are distorted. Furthermore, designing a liquid crystal display operating at a high speed is a matter of great concern and has been studied. To satisfy these requirements, use of a fast-response liquid crystal material such as a ferroelectric liquid crystal may be contemplated.

However, where a ferroelectric liquid crystal is used as the liquid crystal material to accomplish a fast response, it is impossible to fabricate a large area liquid crystal display, for the following reason. A ferroelectric liquid crystal has a layered structure and so if the substrates are deformed, this layered structure is destroyed. This hinders displaying an image. This problem is not restricted to ferroelectric liquid crystals but essentially takes place where various liquid crystal materials are used.

In the past, silicon oxide spacers held between substrates have been used to hold the substrate spacing, and an organic resinous material held between the substrates has been used to maintain the substrates in intimate contact with each other. Literally, spacers are employed to hold the substrate spacing. The substrate spacing is determined by the diameters of the spacers. The organic resin used to maintain substrates in intimate contact with each other has a larger diameter than the required substrate spacing. Organic resin spacers are crushed between the substrates and thus the two substrates are brought into intimate contact with each other.

The prior art configuration described above has been essentially fabricated in the manner described now. The substrate surfaces are first oriented. Then, the above-described spacers and resin are dispersed on one substrate. Subsequently, the substrates are bonded together. In this way, the substrate spacing is determined. Thereafter, a liquid crystal material is injected between the substrates. During this injection, the molecules of the liquid crystal material can be oriented according to the orientation-restricting force of the orientation film, by heating the liquid crystal material, for example at 100° C., and then slowly cooling the material at a rate of 5° C./hr.

We have discussed the above-described manufacturing process and found that the resinous material for maintaining the substrates in intimate contact with each other restricts movement of the liquid crystal molecules when they are being oriented and are changing their state.

In an attempt to solve the above-described two problems, i.e., (1) a structure for maintaining the substrate spacing is needed and (2) when the molecules of the liquid crystal material are oriented, the material for maintaining the substrates in intimate contact with each other adversely affects the orientation of the liquid crystal material, we have devised a method as disclosed in the above-cited Japanese Patent application Ser. No. 55237/1993. In this method, a pair of transparent substrates having electrodes on their surfaces are disposed opposite to each other such that the electrodes are located inside. A liquid crystal material is placed between the substrates. Orientation means is provided on the inner surface of at least one substrate to orient the molecules of the liquid crystal material in a given direction. Uncured resin contained in the liquid crystal material is precipitated (deposited) and cured to form resinous columns. These columns are in intimate contact with the orientation means or with the substrate.

In order to fabricate this liquid crystal electro-optical device, a mixture of the liquid crystal material and a resinous material to which a reaction initiator has been added is sealed in between the transparent opposite substrates whose surfaces have been oriented. The molecules of the liquid crystal material are oriented and then the resinous-component is cured by UV irradiation and shaped into columns.

The structure described above is briefly described now by referring to FIG. 1. Shown in this figure is a simple matrix liquid crystal display having transparent substrates 110 and 111 equipped with electrodes 113 and 112, respectively. Orienting means 114 and 115 for orienting the liquid crystal material molecules in given directions are formed on the substrates, respectively. The liquid crystal material, indicated by 116, is sandwiched between the substrates. The molecules of the liquid crystal material 116 are oriented along their respective one axes by the orienting means 114 and 115. A resin 117 is separated and precipitated (deposited) from the liquid crystal material, and is shaped into columns. These resinous columns are bonded to the orienting means 114 and 115 on the substrates 110 and 111, respectively. Where orientation means is provided on only one substrate, the resinous columns 117 are bonded either to the orienting means 114 and the transparent substrate 111 or to the substrate 111 and the electrodes 113.

This liquid crystal electro-optical device is fabricated in the manner described now. A mixture of the liquid crystal material and the uncured resin to which the reaction initiator has been added is held between the transparent substrates 110 and 111 having the electrodes 113 and 112, respectively. The uncured resin is precipitated (deposited) out of the mixture between the substrates to orient the liquid crystal molecules along the orientation means. Then, the precipitated (deposited) resin is cured into the columns 117. These bond together the substrates.

Where the structure shown in FIG. 1 is adopted, the molecules of the liquid crystal material 116 are oriented by the orienting means 115 and then the resin is cured. Therefore, good orientation of the liquid crystal prior to the curing can be maintained. The cured resin little affects the orientation. The resinous columns 117 maintain the substrate spacing. In addition, the columns improve the adhesion of the substrates. Furthermore, the columns enhance the orientation of the liquid crystal molecules.

Preferably, the resinous material used in the above-described structure shows a mixture state with the liquid crystal material at high temperatures and is separated and precipitated (deposited) from the liquid crystal material in low temperatures.

It is very desired that the uncured resin contain no solvent in order to cure the resin when it is held between the substrates. Since the separation into the liquid crystal material and the resin and the orientation of the liquid crystal material depend heavily on temperature, it is desired to cure the resin independent of temperature. Considering these factors into consideration, we can say that using a UV curable resin as the uncured resin and ultraviolet radiation as the resin-curing means is desired. In the above-described configuration, limitations are imposed neither on the kind of the liquid crystal material nor on the operating mode of the liquid crystal.

Where liquid crystal molecules are oriented parallel to the substrates-in operation, it is necessary that these liquid crystal molecules obey the orientation-restricting force. However, where the resinous component is precipitated (deposited) into columns in the liquid crystal, the liquid crystal molecules are observed to be oriented parallel to, and along, the resinous columns around these columns. This means that the long axes of some liquid crystal molecules are oriented vertical to the substrates, although the long axes of all liquid crystal molecules must be oriented parallel to the substrates. If the disturbance of the orientation becomes conspicuous, the optical characteristics, especially the dark state characteristic, deteriorate. This leads to a decrease in the contrast. That is, where the resinous component is precipitated (deposited) into columns out of the liquid crystal mixture, the contrast is deteriorated in practice.

SUMMARY OF THE INVENTION

Accordingly, it is an object of the present invention to provide a method of fabricating a liquid crystal electro-optical device by precipitating (depositing) resinous columns out of the aforementioned liquid mixture (i.e., a liquid crystal material and an uncured resin to which a reaction initiator has been added), maintaining the substrate spacing by these resinous columns, and maintaining the substrates in intimate contact with each other by the columns. This method is characterized in that the orientation is controlled to improve the contrast. An electro-optical device according to the present invention comprises:

a pair of substrates;

an electro-optical modulating layer provided between the substrates and comprising a liquid crystal material and a resinous material; and a columnar spacer provided between the substrates and comprising the resinous material. The resinous material is adhesive.

It is another object of the invention to provide a liquid crystal electro-optical device which uses a PCS (polymerized column spacer) and in which restricting force acting on liquid crystal molecules is controlled to improve the orientation.

It is a further object of the invention to provide a liquid crystal electro-optical device which uses resinous columns precipitated (deposited) out of a liquid crystal material and in which disturbance of the orientation of the liquid crystal molecules around the columns is prevented even if the volume decreases after curing, thus improving the orientation, the voltage holding ratio, and the optical characteristics.

We conducted fundamental experiments on the structure for precipitating (depositing) resinous columns out of a mixture of the above-described liquid crystal mixture and an uncured resin to which a reaction initiator has been added and have found the following facts.

Where the long axes of liquid crystal molecules are oriented substantially parallel to the substrates, as the hydrophobic property of the resinous columns which stand vertical to the substrates is increased, the restricting force of the resin acting on the liquid crystal molecules weakens. As the force of the resinous columns attracting the liquid crystal is reduced, the restricting force weakens. That is, the restricting force of the resinous columns acting on the liquid crystal can be reduced by enhancing the hydrophobic property of the resinous columns.

Accordingly, it is a yet other object of the invention to provide a liquid crystal display which shows improved contrast and in which resinous columns do not exert an orientation-restricting force on liquid crystal molecules.

A first embodiment of the invention is a liquid crystal display comprising a pair of substrates and a mixture of a liquid crystal material and a resinous material, the mixture being held between the substrates. The molecules of the liquid crystal material is oriented parallel to the substrates. The resinous material contains a hydrophobic material. The substrates are maintained in intimate contact with each other by columns made from the resinous material.

In this embodiment, the resinous columns or cylinders for maintaining the substrates in intimate contact with each other is hydrophobic in nature. This eliminates the effect of the orientation-restricting force of the resinous columns acting on the liquid crystal molecules. As a result, only the orientation-restricting force of the orienting means formed on the substrates orients the liquid crystal molecules.

Especially, where the liquid crystal molecules are oriented parallel to the substrates, the elimination of the orientation-restricting force acting vertical to the substrates is quite effective in enhancing the orientation of the liquid crystal.

The optimum liquid crystals used in the present embodiment are ferroelectric liquid crystals because they have a layered structure and are easily affected by bending of the substrates. However, the present invention is not limited to ferroelectric liquid crystals. Rather, the invention can be applied to all liquid crystal displays which are affected by bending of the substrates.

A second embodiment of the present invention is a liquid crystal display comprising a pair of substrates and a mixture of a liquid crystal material and a resinous material. The liquid crystal material is oriented vertical to the substrates. The resinous material contains a hydrophilic material. The substrates are held in intimate contact with each other by columns made from the resinous material.

This embodiment has been made in view of the fact that where liquid crystal molecules are urged to be oriented substantially vertical (orthogonal) to the substrates, if an orientation-restricting force acts on the liquid crystal molecules parallel to the resinous columns which hold the substrates in intimate contact with each other, then desirable results are obtained. In particular, the resinous columns are made from a hydrophilic material, and the orientation-restricting force acting on the liquid crystal molecules is parallel to the resinous columns. This promotes vertical orientation of the liquid crystal molecules with respect to the substrates.

The liquid crystal display according to the second embodiment may have a homeotropic alignment film provided o at least one of the substrates and in contact with the liquid crystal material. For example, the homeotropic alignment film is a film using a silane coupling agent or a silicon oxide obliquely deposited film.

In the embodiments described above, it is advantageous to fabricate the resinous columns from a material which exhibits hydrophobic or hydrophilic property.

Where the resinous columns are made from a resinous material which enhances the hydrophobic nature, the orientation-restricting force of the resinous columns acting on the liquid crystal molecules can be weakened. Most of the force acting on the liquid crystal molecules is the restricting force produced by the orienting means. As a result, the liquid crystal molecules are oriented well.

Where a hydrophilic material is added to the resinous columns, vertical orientation of the liquid crystal molecules with respect to the substrates is promoted because the resinous columns positively exert an orientation-restricting force on the molecules.

A third embodiment of the invention is a method comprising the steps of: preparing a mixture of a liquid crystal material and an uncured resin; placing the mixture between a pair of transparent substrates disposed opposite to each other; precipitating (depositing) the uncured resin out of the mixture; orienting molecules of the liquid crystal material; curing the uncured resin; and reorienting the molecules of the liquid crystal material. First, the uncured resinous material is precipitated (deposited) out of the mixture of the liquid crystal material and the uncured resin by slow cooling or other method, the mixture being held in the cell. The molecules of the liquid crystal material are oriented. Then, the uncured resin is cured. At this time, the resin shrinks, causing a disturbance of the orientation of the liquid crystal molecules around the resin. Subsequently, the molecules are reoriented, for example by heating and slow cooling. This step will hereinafter be referred to as the aging step. In consequence, disturbance of the orientation around the resin is removed. Hence, the voltage holding ratio is improved. This leads to an improvement in the optical characteristics.

A fourth embodiment of the invention is a liquid crystal electro-optical device comprising a pair of substrates, an electro-optical modulating layer provided between the substrates and comprising a liquid crystal material and a resin, an orientation film formed on the inner surface of at least one of the substrates to orient molecules of the liquid crystal material in a direction substantially parallel to the substrates, and a columnar spacer provided between the substrates and comprising the resin. This embodiment is characterized in that the surface tension of the orientation film is greater than that of the columnar spacer.

A fifth embodiment of the invention is a liquid crystal electro-optical device comprising a pair of substrates, an electro-optical modulating layer provided between the substrates and comprising a liquid crystal material and a resin, an orientation film formed on the inner surface of at least one of the substrates to orient molecules of the liquid crystal material in a direction substantially orthogonal to the substrates, and a columnar spacer formed between the substrates and comprising the resin. This embodiment is characterized in that the surface tension of the orientation film is smaller than that of the columnar spacer.

In a liquid crystal electro-optical device using a polymerized column spacer (PCS) according to the invention, the attracting force of the orientation film (simply, its surface tension) acting on liquid crystal molecules of the resin is controlled at will to control the orientation of the molecules of the liquid crystal material. In this way, the orientation is improved.

Generally, as the surface tension increases, the force attracting liquid crystal molecules increases. Therefore, where the liquid crystal molecules are oriented parallel to the orientation film (i.e., the pretilt angle made with respect to the substrate surfaces is about 0°–45°), the orientation is improved by increasing the surface tension of the orientation film and reducing the surface tension of the PCS. Where the liquid crystal molecules are oriented vertical to the orientation film (i.e., the pretilt angle made with respect to the substrate surfaces is about 45°–90°), the orientation is improved by reducing the surface tension of the orientation film and increasing the surface tension of the PCS.

Various methods can be utilized to control the surface tensions. For example, the composition of the material is varied. The baking time, the baking temperature, the dilution concentration, the film thickness, or other factor of the material is changed. The surface shape is varied. A coupling agent is applied. An appropriate method may be selected according to the circumstances. In this way, in a liquid crystal electro-optical device using a polymerized column spacer according to the invention, the restricting force acting on the molecules of the liquid crystal material is controlled, thus improving the orientation.

Other objects and features of the invention will appear in the course of the description thereof, which follows.

BRIEF DESCRIPTION OF THE DRAWINGS

FIG. 1 is a schematic view of a liquid crystal electro-optical device according to the invention;

FIG. 2 is a graph illustrating the relation of the photomultiplier sensitivity to the contact angle of the pure water with respect to the added resin of Example 1 of the invention in bright state;

FIG. 3 is a graph similar to FIG. 2 but illustrating the relation in dark state; and FIG. 4 is a graph illustrating the relation of the contrast ratio to the contact angle of Example 1.

DETAILED DESCRIPTION OF THE INVENTION

EXAMPLE 1

A liquid crystal electro-optical device according to the present example is schematically shown in FIG. 1. This device comprises substrates 110 and 111 each of which is made of a glass substrate measuring 10×10 cm. ITO was sputtered on the glass substrates 110 and 111 to a thickness of 1000 Å. The resulting films were photolithographically patterned to form electrodes 112 and 113. Polyimide was applied to a thickness of 150 Å by spin coating. The laminate was baked at 280° C. and then rubbed to form orientation films 114 and 115 which are orienting means. RN-305 produced by Nissan Kagaku Kogyo, Japan, and LP-64 produced by Toray, Japan, were used as the polyimide.

Thereafter, the orientation films 114 and 115 made of polyimide were oriented in a known manner to orient the molecules of the films along one axis. Spherical silica particles manufactured by Shokubai Kasei, Japan, were dispersed as spacers on one of the substrates 110 and 111. The sealing material 119 of epoxy resin was screen printed on the other substrate. The substrates were bonded together such that the spacing between their electrodes was about 1.5 μm. A mixture 116 of a liquid crystal material and an uncured resinous material was injected into the cell between the substrates, thus completing a liquid crystal cell.

The liquid crystal material used in the present example was ferroelectric liquid crystal CS1014 produced by Chisso Corporation, Japan. Ps of this liquid crystal material was 5.4 nC/cm². The phase sequence was I (isotropic phase)-N (nematic phase)-A (smectic A phase)-C (smectic C* phase).

The resinous material used in the present example is a mixture of a hydrophobic urethane oligomer and an acrylic monomer and contains 1% by weight of a reaction initiator. Five percent by weight of this mixture and 95% by weight of the liquid crystal material were mixed to prepare a liquid crystal mixture. At this time, the materials were heated at 90° C. and stirred so that the resinous material might be mixed well into the liquid crystal material, until the liquid crystal material showed anisotropy.

The above-described liquid crystal mixture was injected into the liquid crystal cell by a well-known method. During this injection, the temperature was set to 90° C. Under a vacuum, the mixture was slowly cooled at a rate of 2° C./hr. As a result, molecules of the liquid crystal mixture 116 held between the substrates were oriented along one axis in the same way as molecules of ordinary liquid crystal materials.

After the orientation step described above, the mixture was irradiated with ultraviolet radiation to precipitate (deposit) the resinous material and to form the resinous columns 117 substantially orthogonal to the substrates. The UV irradiant intensity was 20 mW/cm². The irradiation time was 1 minute. The resinous columns are used as spacers.

In the present example, the following four samples A–D were made and their characteristics were measured.

(1) A mixture of a hydrophobic urethane oligomer and an acrylic monomer in a weight ratio of 10:90. Since the reaction initiator was less than 1% by weight, it was neglected.

(2) A mixture of an urethane oligomer and an acrylic monomer in a weight ratio of 17:83.

(3) A mixture of an urethane oligomer and an acrylic monomer in a weight ratio of 25:75.

(4) A mixture of an urethane oligomer and an acrylic monomer in a weight ratio of 34:66.

Table 1 below shows acrylic monomer contents (weight %) of uncured resins each consisting of a urethane oligomer and an acrylic monomer, the contact angles of the cured resins with respect to pure water, and the contrast of each formed liquid crystal cell.

TABLE 1

| resin | oligomer content of resin | contact angle of resin with respect to pure water | contrast |
| --- | --- | --- | --- |
| A | 10% | 49.4° | 37.38 |
| B | 17% | 51.0° | 42.45 |
| C | 25% | 55.8° | 62.97 |
| D | 34% | 66.0° | 78.65 |

It can be seen from Table 1 that as the monomer content of the resin decreases, i.e., as the percentage of the hydrophobic urethane oligomer decreases, the contact angle of the resin with respect to pure water increases, thus increasing the hydrophobic nature. This enhances the contrast of the liquid crystal cell.

FIG. 2 shows the relation of the sensitivity of a photomultiplier to the contact angle of each liquid crystal cell fabricated in the present example under bright condition. In the measurement, a triangular wave of ±30 V was applied across the cell. As can be seen from Table 1, this relation corresponds to the samples A–D. It can be seen from FIG. 1 that data about the samples have no great difference.

FIG. 3 shows the relation of the sensitivity of the photomultiplier to the contact angle of each liquid crystal cell fabricated in the present example under dark condition. It can be seen from FIG. 3 that as the percentage of the hydrophobic urethane oligomer is increased, the photomultiplier sensitivity decreases, thus creating a darker state. That is, the dark state becomes more noticeable.

FIG. 4 shows the relation of the contrast ratio of each liquid crystal cell fabricated in the present example to the contact angle. In the measurement, a triangular wave of ±30 V was applied across the cell. It can be seen from FIG. 4 that as the percentage of the hydrophobic urethane oligomer increases, the contrast ratio increases.

The results of these measurements reveal that the optical characteristics of the liquid crystal display can be enhanced by adding a hydrophobic urethane oligomer to an uncured resin which is mixed with a liquid crystal material. Also, it can be seen that where the ratio of the hydrophobic urethane oligomer is more than 20% by weight, a contrast ratio exceeding 40 can be obtained, and that a contrast ratio exceeding 40 can be derived by setting the contact angle of the resin with respect to pure water larger than 50 degrees.

In the present example, a ferroelectric liquid crystal which has a layered structure and is affected greatly by bending of the substrates is used. In other words, the effects become more conspicuous. Other liquid crystal materials may also be employed. Obviously, the novel configuration is not limited to simple matrix liquid crystal displays. For example, the novel configuration may also be applied to active matrix liquid crystal displays using TFTs and MIM devices.

EXAMPLE 2

Indium tin oxide (ITO) which is an electrode material was deposited on a glass substrate 10 cm square to a thickness of 500–2000 Å by sputtering or evaporation. In the present example, the thickness was 1000 Å. The film was patterned by an ordinary photolithography process to form an electrode pattern. Polyimide was applied to the laminate by spin coating and then baked at 280° C. RN-305 produced by Nissan Kagaku Kogyo, Japan, and LP-64 produced by Toray, Japan, were used as the polyimide which was used as the material of an orientation film. The thickness of the polyimide film was 100–800 Å. In the present example, the thickness was 150 Å. This substrate was rubbed to orient the molecules along one axis. Another substrate was fabricated similarly. Spherical silica particles were dispersed as spacers on one of these two substrates. A sealing material of epoxy resin was screen printed on the other substrate. Both substrates were bonded together with a spacing of about 1.5 μm. Thus, a cell was formed.

The liquid crystal material used in the present example was ferroelectric liquid crystal CS1014 produced by Chisso Corporation, Japan. Ps of this liquid crystal material was 5.4 nC/cm$^2$. The phase sequence was I (isotropic phase)-N (nematic phase)-A (smectic A phase)-C (smectic C* phase). The resinous material used in the present example was a mixture of a urethane oligomer and an acrylic monomer both of which are commercially available.

Ninety five % by weight of the above-described liquid crystal material and 5% by weight of an uncured resinous material were mixed up, heated at 90° C., and stirred until the liquid crystal material showed isotropic phase or nematic phase. In this way, the resinous material was uniformly dispersed in the liquid crystal material. A liquid crystal cell and the liquid crystal mixture were heated to 90° C. The liquid crystal mixture was injected into the cell under a vacuum. After the injection, the cell was slowly cooled down to room temperature at a rate of 2°–20° C./hr, in the present example 2° C./hr. Orientation at room temperature was observed with a polarization microscope. As a result, we have found that the resinous material was sporadically distributed in the cell. The molecules of the liquid crystal material were oriented along one axis, i.e., along the rubbing direction of the orientation film, in the same way as a liquid crystal material to which no resin has been added. In this manner, a good quenching position was obtained.

This cell was irradiated with ultraviolet radiation having a strength of 3 to 30 mW/cm$^2$ for a time of 0.5 to 5 min to cure the resin. In the present example, the strength was 20 mW/cm$^2$, and the irradiation time was 1 min. After the UV irradiation, the molecules of the liquid crystal material were kept oriented along one axis, i.e., along the rubbing direction, and a good quenching position was obtained.

A triangular wave of ±30 V was applied across the cell, and its optical characteristics were measured. Careful observation of the operation has revealed that light was quenched around the resin in a dark display condition although the amount of the quenching was quite small. At this time, an arbitrary value indicating the bright state was 35.26. An arbitrary value indicating the dark state was 1.131. The contrast ratio was 31.16. A pulse of ±20 V was applied for 60 μm. Under this condition, the voltage holding ratio was 45.0%. The cell was caused to age. The age is carried out by heating the liquid crystal material until the liquid crystal material shows isotropic phase or nematic phase followed by cooling the liquid crystal material. Then, the cell was observed with the naked eye. The quenching of light around the resin was improved considerably. At this time, an arbitrary value indicating the bright state was 40.08. An arbitrary value indicating the dark state was 0.924. The contrast ratio was 43.39. The voltage holding ratio was 49.0%. The actual characteristics were improved greatly.

EXAMPLE 3

The present example is similar in structure to Example 2 and uses the same liquid crystal material and the same resinous material as those used in Example 2.

Eighty five % by weight of the above-described liquid crystal material and 15% by weight of the uncured resinous material were mixed up, heated at 90° C., and stirred until the liquid crystal material showed isotropic phase, thus forming a liquid crystal mixture. A liquid crystal cell and the liquid crystal mixture were heated to 90° C. The liquid crystal mixture was injected into the cell under a vacuum. After the injection, the cell was slowly cooled down to room temperature at a rate of 2°–20° C./hr, in the present example 2° C./hr. Orientation at room temperature was observed with a polarization microscope. As a result, we have found that the resinous material was sporadically distributed in the cell. The molecules of the liquid crystal material were oriented along one axis, i.e., along the rubbing direction of the orientation film, in the same way as a liquid crystal material to which no resin has been added. In this manner, a good quenching position was obtained.

This cell was irradiated with ultraviolet radiation having a strength of 3 to 30 mW/cm$^2$ for a time of 0.5 to 5 min to cure the resin. In the present example, the strength was 20 mW/cm$^2$, and the irradiation time was 1 min. After the UV irradiation, the molecules of the liquid crystal material were kept oriented along one axis, i.e., along the rubbing direction, and a good quenching position was obtained.

A triangular wave of ±30 V was applied across the cell, and its optical characteristics were measured. Careful observation of the operation has revealed that light was quenched around the resin in a dark display condition although the amount of the quenching was quite small. At this time, an arbitrary value indicating the bright state was 22.89. An arbitrary value indicating the dark state was 3.491. The contrast ratio was 6.6. The voltage holding ratio was 61.0%. The cell was made to age and then observed with the naked eye. The quenching of light around the resin was improved considerably. At this time, an arbitrary value indicating the bright state was 31.48. An arbitrary value indicating the dark state was 3.162. The contrast ratio was 10. The voltage holding ratio was 71.0%. The actual characteristics were improved greatly.

EXAMPLE 4

Indium tin oxide (ITO) which is an electrode material was deposited on a glass substrate 10 cm square to a thickness of 500–2000 Å by sputtering or evaporation. In the present example, the thickness was 1000 Å. The film was patterned by an ordinary photolithography process to form an electrode pattern. Orientation film materials were applied to the laminate by spin coating and then baked. Three kinds of orientation film material were used. This substrate was rubbed to orient the molecules along one axis. Another substrate was fabricated similarly. Spherical silica particles manufactured by Shokubai Kasei, Japan, were dispersed as spacers on one of these two substrates. A sealing material of epoxy resin was screen printed on the other substrate. Both substrates were bonded together with a spacing of about 1.5 µm. Thus, a cell was formed.

One liquid crystal material used in the present example was ferroelectric liquid crystal A having a phase sequence I (isotropic phase)-N (nematic phase)-A (smectic A phase)-C (smectic C* phase). Another liquid crystal material used in the present example was ferroelectric liquid crystal B having a phase sequence I-A-C. A commercially available UV curable resin having a surface tension of 50.1 dyne/cm was used.

Ninety five % by weight of the above-described liquid crystal material and 5% by weight of the uncured resinous material were mixed. In order to mix up these two materials, they were heated and stirred until the liquid crystal material showed isotropic phase or nematic phase. In this way, the resinous material was uniformly dispersed in the liquid crystal material, thus forming a liquid crystal mixture.

A liquid crystal cell and the liquid crystal mixture were heated until an isotropic phase or a nematic phase was obtained. The liquid crystal mixture was injected into the cell under a vacuum. After the injection, the cell was slowly cooled down to room temperature at a rate of 2°–20° C./hr, in the present example 2° C./hr. Orientation at room temperature was observed with a polarization microscope. As a result, we have found that the molecules of the liquid crystal materials A and B were oriented horizontally and that the resinous material was sporadically dispersed in the cell.

This cell was irradiated with ultraviolet radiation having a strength of 3 to 30 mW/cm$^2$ for a time of 0.5 to 5 min to cure the resin. In the present example, the strength was 20 mW/cm$^2$, and the irradiation time was 1 min. The resinous material was cured into columns and sporadically dispersed in the cell. The orientation of this liquid crystal in the cell was measured. A triangular wave of ±30 V was applied across the cell, and its optical characteristics were measured. The results are shown in Table 2 below.

TABLE 2

| orientation film material | surface tension (dyne/cm) | contrast ratio A | contrast ratio B |
| --- | --- | --- | --- |
| 1 | 69.67 | 77.5 | 78.9 |
| 2 | 61.31 | 56.4 | 16.9 |
| 3 | 51.00 | 4.17 | 15.2 |

The results show that the values indicating bright state did not differ greatly and that the values indicating dark state are increased as the surface tension of the orientation film became greater than the surface tension of the resinous columns. As a result, the contrast ratio was also enhanced.

The surface tension of the orientation film of a vertically oriented liquid crystal display was reduced for a give surface tension of the resinous material. The values indicating dark state were increased. As a result, the contrast ratio was enhanced.

As described thus far, the present invention can improve the orientation of the liquid crystal molecules of a liquid crystal display using polymerized column spacers. Also, the contrast ratio can be improved. Furthermore, a liquid crystal display providing a high contrast ratio can be obtained. In this display, resinous columns precipitated (deposited) out of an uncured resin maintain the substrates in intimate contact with each other. A hydrophobic resinous material is added to the uncured resin which is mixed with a liquid crystal material.

A liquid crystal display uses resinous columns which are formed by adding a resinous material to a liquid crystal material and precipitating (depositing) the resinous material out of the liquid crystal material. In fabrication of this liquid crystal display, if an aging step according to the invention is added, then the orientation of the liquid crystal material is prevented from being disturbed although the formed resinous columns shrink after they are cured. Hence, the voltage holding ratio and the optical characteristics can be improved.

The present invention can be applied to various kinds of liquid crystals such as nematic liquid crystals and ferroelectric liquid crystals. Also, the invention can be used in active matrix devices and other various devices using a simple matrix structure or switching devices.

What is claimed is:

1. An electro-optical device comprising:

a pair of substrates;

an electro-optical modulating layer provided between the substrates and comprising a liquid crystal material and a resinous material, said resinous material comprising a hydrophilic material, said liquid crystal material comprising a molecule oriented substantially orthogonal to the substrates; and a columnar spacer provided between the substrates and comprising said resinous material.

2. The device of claim 1 wherein the resinous material is adhesive.

3. The device of claim 1 wherein the columnar spacer is substantially orthogonal to the substrates.

4. The device of claim 1 wherein the molecule is oriented by a homeotropic alignment film provided on at least one of the substrates and in contact with the liquid crystal material.

5. The device of claim 1 wherein said liquid crystal is a ferroelectric liquid crystal.

6. An electro-optical device comprising:

a pair of substrates;

an electro-optical modulating layer provided between the substrates and comprising a liquid crystal material and a resinous material, said resinous material having a structure exhibiting a hydrophilic property, said liquid crystal material comprising a molecule oriented substantially orthogonal to the substrates; and a columnar spacer provided between the substrates and comprising said resinous material.

7. The device of claim 6 wherein the resinous material is adhesive.

8. The device of claim 6 wherein the columnar spacer is substantially orthogonal to substrates.

9. The device of claim 6 wherein said liquid crystal is a ferroelectric liquid crystal.

10. An electro-optical device comprising:

a pair of substrates;

an electro-optical modulating layer provided between the substrates and comprising a liquid crystal material and a resinous material;

an orientation film provided on an inner surface of at least one of the substrates to orient molecules of the liquid crystal material in a direction substantially orthogonal to the substrates; and a columnar spacer provided between the substrates and comprising the resinous material, wherein the orientation film has a surface tension smaller than that of the columnar spacer.

11. The device of claim 10 wherein said liquid crystal is a ferroelectric liquid crystal.

12. An electro-optical device comprising:

a pair of substrates;

an electro-optical modulating layer provided between the substrates and comprising a liquid crystal material and a resinous material;

an orientation film provided on an inner surface of at least one of the substrates to orient molecules of the liquid crystal material in a direction substantially orthogonal to the substrates; and a columnar spacer provided between the substrates and comprising the resinous material, wherein the orientation film has a force which attracts liquid crystal molecules of said liquid crystal material.

13. The device of claim 12 wherein said liquid crystal is a ferroelectric liquid crystal.

14. An electro-optical device comprising:

a pair of substrates;

an electro-optical modulating layer provided between the substrates and comprising a liquid crystal material and a resinous material;

an orientation film provided on an inner surface of at least one of the substrates to orient molecules of the liquid crystal material in a direction substantially parallel to the substrates; and a columnar spacer provided between the substrates and comprising the resinous material, wherein the orientation film has a force which attracts liquid crystal molecules of said liquid crystal material.

15. The device of claim 14 wherein said liquid crystal is a ferroelectric liquid crystal.

16. An electro-optical device comprising:

a pair of substrates;

an electro-optical modulating layer provided between the substrates and comprising a liquid crystal material and a resinous material;

an orientation film provided on an inner surface of at least one of the substrates to orient molecules of the liquid crystal material in a direction substantially orthogonal to the substrates; and a columnar spacer provided between the substrates and comprising the resinous material, wherein the orientation film has a force which attracts liquid crystal molecules of said liquid crystal material;

wherein said liquid crystal material is separated from said resinous material; and wherein a surface tension of said resinous material is greater than that of said orientation film.

17. The device of claim 16 wherein said liquid crystal is a ferroelectric liquid crystal.

* * * * *